(12) United States Patent
Shibata et al.

(10) Patent No.: US 11,301,695 B2
(45) Date of Patent: Apr. 12, 2022

(54) ORIENTATION DETECTION DEVICE AND NON-TRANSITORY COMPUTER READABLE MEDIUM

(71) Applicant: DENSO CORPORATION, Kariya (JP)

(72) Inventors: Shunsuke Shibata, Nisshin (JP); Masayuki Imanishi, Nisshin (JP); Takeshi Hato, Kariya (JP); Daisuke Takemori, Kariya (JP); Hiroto Banno, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 16/868,192

(22) Filed: May 6, 2020

(65) Prior Publication Data

US 2020/0311442 A1   Oct. 1, 2020

Related U.S. Application Data

(63) Continuation of application No. PCT/JP2018/035277, filed on Sep. 25, 2018.

(30) Foreign Application Priority Data

Nov. 10, 2017   (JP) .............................. JP2017-217469

(51) Int. Cl.
*G06K 9/00* (2006.01)
*G06T 7/73* (2017.01)
*G09G 5/38* (2006.01)
*H04N 9/31* (2006.01)

(52) U.S. Cl.
CPC ............ *G06K 9/00791* (2013.01); *G06T 7/73* (2017.01); *G09G 5/38* (2013.01); *H04N 9/3179* (2013.01); *G06T 2207/30252* (2013.01)

(58) Field of Classification Search
CPC ......... G06K 9/00791; G06T 7/70; G06T 7/73; G06T 2207/30244; G06T 2207/30252; G01C 21/005; G01C 21/30; G05D 1/0891; B60W 40/076; B60W 40/11; B60W 2520/16; B60W 2552/15; B60W 2720/16
See application file for complete search history.

(56) References Cited

U.S. PATENT DOCUMENTS

| 2017/0039433 | A1* | 2/2017 | Kawano et al. | ....... H04N 5/232 |
| 2019/0139286 | A1* | 5/2019 | Shimoda et al. | ...... B60K 35/00 |
| 2020/0273435 | A1* | 8/2020 | Shibata et al. | ......... B60K 37/04 |
| 2020/0333608 | A1* | 10/2020 | Katagiri et al. | ... G02B 27/0101 |

FOREIGN PATENT DOCUMENTS

| JP | 2015158417 A | 9/2015 |
| JP | 2019020393 A | 2/2019 |

OTHER PUBLICATIONS

U.S. Appl. No. 16/867,974, filed May 6, 2020, Shunsuke Shibata et al.

* cited by examiner

*Primary Examiner* — Andrew W Johns
(74) *Attorney, Agent, or Firm* — Harness, Dickey & Pierce, P.L.C.

(57) ABSTRACT

An orientation detection device obtains a detection information of a sensor that detects a displacement in the vertical direction occurring in the vehicle, computes a pitch angle of the vehicle on the basis of the detection information, obtains a gradient information indicating a gradient of a road on which the vehicle travels, and corrects a correlation between the detection information used in computation and the pitch angle on the basis of the gradient information.

16 Claims, 11 Drawing Sheets

<FLAT ROAD>

ROAD GRADIENT $\theta$ =VEHICLE GRADIENT $\phi$=0

<SLOPING ROAD>

ROAD GRADIENT $\theta \neq$ VEHICLE GRADIENT $\phi$

<FLAT ROAD>

<SLOPING ROAD>

$$\theta = \tan^{-1} \frac{Z_2 - Z_1}{\sqrt{(X_2 - X_1)^2 + (Y_2 - Y_1)^2}}$$

ORIENTATION DETECTION DEVICE AND NON-TRANSITORY COMPUTER READABLE MEDIUM

CROSS REFERENCE TO RELATED APPLICATIONS

The present application is a continuation application of International Patent Application No. PCT/JP2018/035277 filed on Sep. 25, 2018, which designated the U.S. and claims the benefit of priority from Japanese Patent Application No. 2017-217469 filed on Nov. 10, 2017. The entire disclosures of all of the above applications are incorporated herein by reference.

TECHNICAL FIELD

The present disclosure relates to an orientation detection device and a non-transitory computer readable medium for detecting orientation of a vehicle.

BACKGROUND

As an example of a device for detecting orientation of a vehicle, a self-position calculation device has a projector projecting a pattern light onto the surface of a road around a vehicle and an imaging unit taking an image of the road surface in an area in which the pattern light is projected. The self-position calculation device calculates the orientation angle of the vehicle on the basis of position of the pattern light on the road surface.

SUMMARY

The present disclosure describes an orientation detection device for detecting orientation of a vehicle, and a non-transitory computer readable medium therefor. The orientation detection device obtains a detection information of a sensor, which detects a displacement in the vertical direction occurring in the vehicle, computes a pitch angle of the vehicle on the basis of the detection information, obtains a gradient information indicating a gradient of a road on which the vehicle travels, and corrects a correlation between the detection information used in computation and the pitch angle on the basis of the gradient information.

BRIEF DESCRIPTION OF DRAWINGS

Features and advantages of the present disclosure will become more apparent from the following detailed description made with reference to the accompanying drawings.

DETAILED DESCRIPTION

Figure 1:
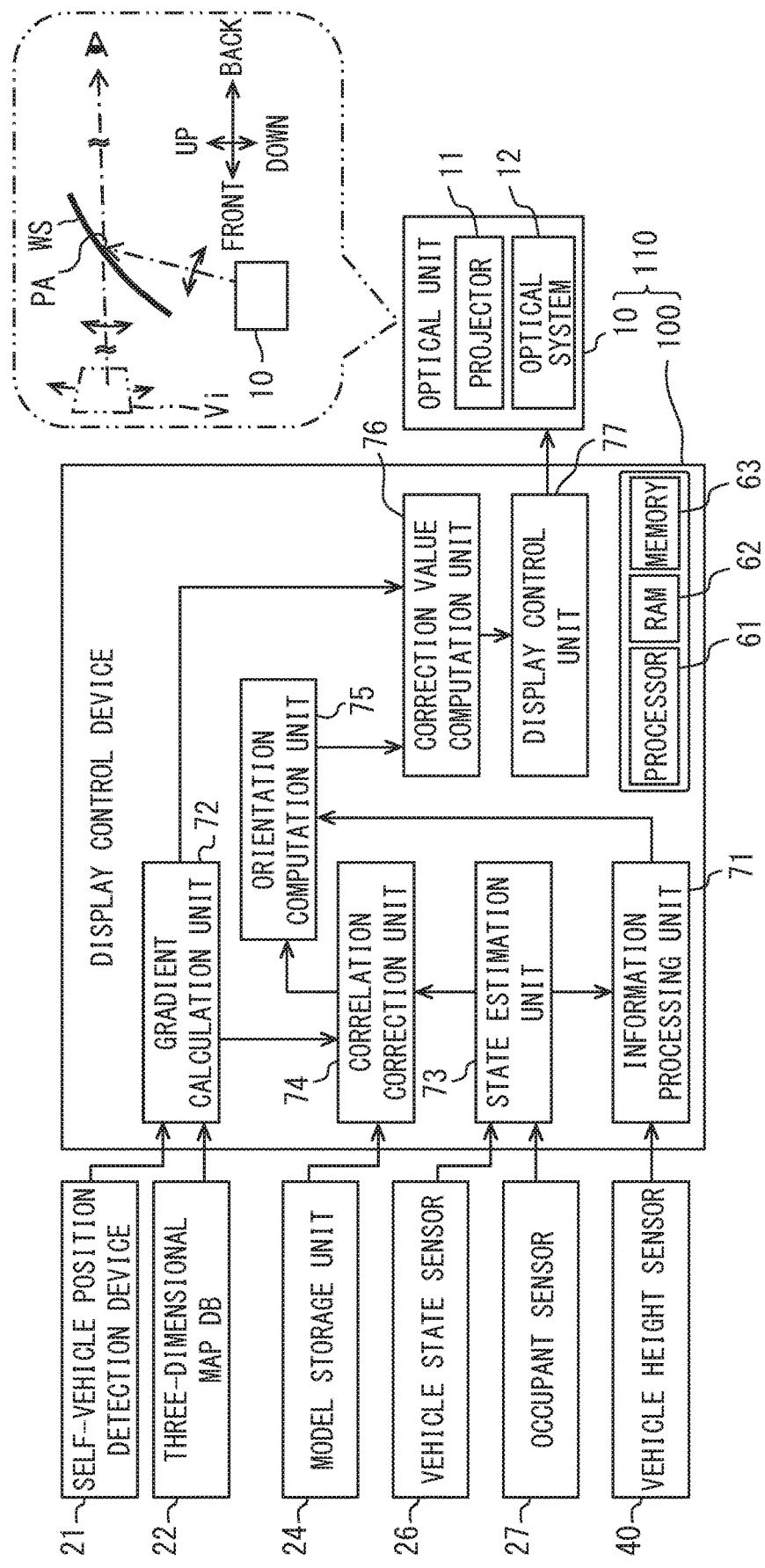
FIG. 1 is a block diagram illustrating an overall image of an in-vehicle system including a display control device according to a first embodiment of the present disclosure.

As an example of a device for detecting orientation of a vehicle, it has been proposed a self-position calculation device having a projector projecting a pattern light onto the surface of a road around a vehicle and an imaging unit taking an image of the road surface in an area in which the pattern light is projected. The self-position calculation device calculates the orientation angle of the vehicle on the basis of position of the pattern light on the road surface.

However, having the projector for projecting a pattern light for detecting the orientation angle of a vehicle results in complication of the configuration. Therefore, it is conceivable to employ a configuration of computing the orientation angle of a vehicle on the basis of detection information of a sensor, such as an acceleration sensor or a vehicle height sensor, which is generally mounted in a vehicle for detecting a displacement in the vertical direction. However, in the case of using such a sensor, it is newly found that, particularly, computation of a pitch angle is easily influenced by the gradient of a road on which the vehicle is traveling and decrease in detection precision is caused.

The present disclosure provides an orientation detection device capable of suppressing decrease in detection precision of a pitch angle caused by a road gradient while avoiding complication of a configuration used for orientation detection.

According to an aspect of the present disclosure, an orientation detection device for detecting orientation of a vehicle includes: a detection information obtaining unit obtaining a detection information of a sensor that senses a displacement in the vertical direction occurring in the vehicle; an orientation computation unit computing a pitch angle of the vehicle on the basis of the detection information; a gradient information obtaining unit obtaining a gradient information indicating a gradient of a road on which the vehicle travels; and a correlation correction unit correcting a correlation between the detection information used in computation of the orientation computation unit and the pitch angle on the basis of the gradient information.

The present disclosure also provides a non-transitory computer readable medium storing a computer program product comprising instructions for detecting an orientation of a vehicle. According to an aspect, the instructions being configured to, when executed by a processor, cause the processor to: obtain a detection information of a sensor that senses a displacement in the vertical direction occurring in the vehicle; compute a pitch angle of the vehicle on the basis of the detection information; obtains a gradient information indicating a gradient of a road on which the vehicle travels; and correct a correlation between the detection information used in computation and the pitch angle on the basis of the gradient information.

In the orientation detection device and the non-transitory computer readable medium according to the above aspects, the correlation between detection information of the sensor and the pitch angle as described above can indicate a substantially unique change in accordance with the magnitude of a road gradient. By paying attention to such a phenomenon, in the above-described aspects, the correlation between the detection information of the sensor and the pitch angle is corrected to a state adapted to the road gradient of the road on which the vehicle is travelling. By the above, also during travel on a road with a gradient, the pitch angle computed becomes insusceptible to the influence of the road gradient and can become a value maintaining precision. Therefore, while avoiding complication of the configuration for orientation detection, decrease in detection precision of a pitch angle caused by a road gradient can be suppressed.

Embodiments of the present disclosure will be hereinafter described with reference to the drawings.

First Embodiment

A display control device 100 according to a first embodiment of the present disclosure illustrated in FIG. 1 is applied to a virtual image display system 110 used in a vehicle. The virtual image display system 110 presents various information related to a vehicle to the driver by using a virtual image Vi superimposed on the foreground of the vehicle. The virtual image display system 110 is configured by combining an optical unit 10, the display control device 100, and the like.

The optical unit 10 is one of a plurality of displays mounted in the vehicle and electrically connected to the display control device 100. The optical unit 10 projects light of a display light image in a projection area PA designated in a windshield WS of the vehicle and displays the virtual image Vi of the display light image so that it can be visually recognized by an occupant (for example, the driver) of the vehicle. The optical unit 10 has a projector 11 and a reflective optical system 12 as components for displaying the virtual image Vi.

The projector 11 projects light of a display light image formed as the virtual image Vi toward the reflective optical system 12. The reflective optical system 12 projects the light of the display light image incident from the projector 11 to the projection area PA. The light projected to the windshield WS is reflected by the projection area PA toward an eye point side and perceived by the driver. Alternatively, the projection area PA may be designated in a projection member such as a combiner provided separately from the windshield WS.

The display control device 100 is an electronic control unit controlling display by the display mounted in the vehicle. The display control device 100 has a function of detecting the orientation of the vehicle as one of functions for controlling virtual image display by the optical unit 10. The display control device 100 controls so as to correct the projection position and the projection shape of a display light image in accordance with an orientation change of the vehicle and form the virtual image Vi of a proper shape in a proper position in the foreground (refer to FIG. 6). The display control device 100 is electrically connected directly or indirectly to a self-vehicle position detection device 21, a three-dimensional map database 22, a model storage unit 24, a vehicle state sensor 26, an occupant sensor 27, a vehicle height sensor 40, and the like to obtain information necessary to detect the vehicle orientation.

The self-vehicle position detection device 21 receives positioning signals from a plurality of satellites. The self-vehicle position detection device 21 can receive positioning signals from positioning satellites of at least one satellite positioning system from satellite positioning systems such as GPS, GLONASS, Galileo, IRNSS, QZSS, and Beidou. The self-vehicle position detection device 21 measures the position of the self-vehicle, on which the display control device 100 is mounted, on the basis of the received positioning signals. The self-vehicle position detection device 21 sequentially outputs the measured vehicle position information toward the display control device 100.

The three-dimensional map database (hereinbelow, "three-dimensional map DB") 22 is configured mainly by a large-capacity storage medium storing a number of pieces of three-dimensional map data and two-dimensional map data. The three-dimensional map data is high-precision map data which enables automatic driving of a vehicle. In the three-dimensional map data, a landform and a structure are expressed by a point group having three-dimensional coordinate information. The three-dimensional map DB 22 can update three-dimensional map data to latest information through a network. The three-dimensional map DB 22 can provide three-dimensional map data around and in the travel direction of a vehicle to the display control device 100 in accordance with a request from the display control device 100. In the case where three-dimensional map data in an area requested to be provided is not ready, the three-dimensional map DB 22 provides usual two-dimensional map data used for navigation or the like to the display control device 100.

Figure 8:
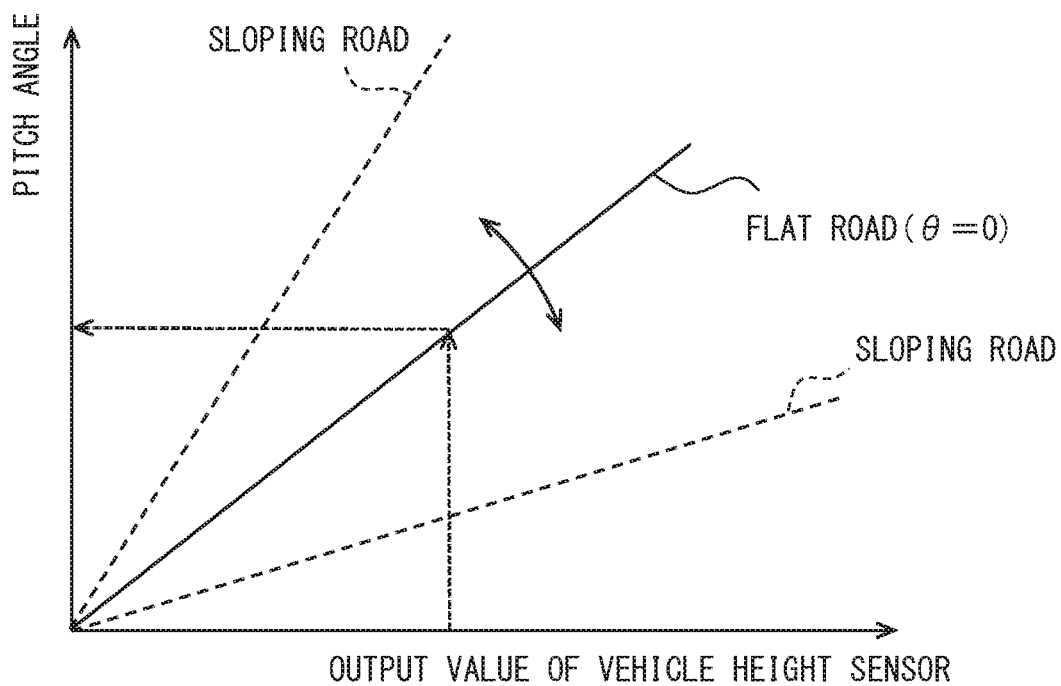
FIG. 8 is a diagram illustrating a tilt model calculating a pitch angle from an output value of a vehicle height sensor and illustrating an example of a correlation function corrected on the basis of road gradients.

The model storage unit 24 is configured mainly by a storage medium and stores a tilt model necessary to compute a tilt of the vehicle with respect to the road surface. A tilt model is a unique numerical value, function, or the like which varies among vehicles and is obtained in advance by examination, calculation, or the like. The model storage unit 24 stores a function (refer to FIG. 8) indicating a correlation between an output value of the vehicle height sensor 40 and a pitch angle of the vehicle as one of tilt models. The model storage unit 24 provides a tilt model corresponding to the present state of the vehicle to the display control device 100 in response to a request from the display control device 100.

The vehicle state sensor 26 is a sensor group mounted in the vehicle and detecting the state of the vehicle. The vehicle state sensor 26 includes, for example, a vehicle speed sensor, a steering angle sensor, an acceleration sensor, an accelerator position sensor (hereinbelow, "AP sensor"), and a brake pedal sensor. To the display control device 100, vehicle speed information detected by the vehicle speed sensor, steering angle (handle angle) information detected by the steering angle sensor, acceleration information in the front-back direction detected by the acceleration sensor, and the like is sequentially provided. In addition, to the display control device 100, accelerator position information detected by the AP sensor, brake pedal force information detected by the brake pedal sensor, and the like is also sequentially provided.

The occupant sensor 27 is a sensor for measuring the number of occupants in the vehicle. The occupant sensor 27 is disposed in each of the seating faces of the driver's seat, the front passenger seat, and the rear passenger seats. The occupant sensor 27 is, for example, a switch which is turned on/off by application of a load and detects seating of an occupant on each of the seating faces. A detection result by the occupant sensor 27 is information indicating a seat on which an occupant sits in the vehicle and is sequentially obtained by the display control device 100.

Figure 2:
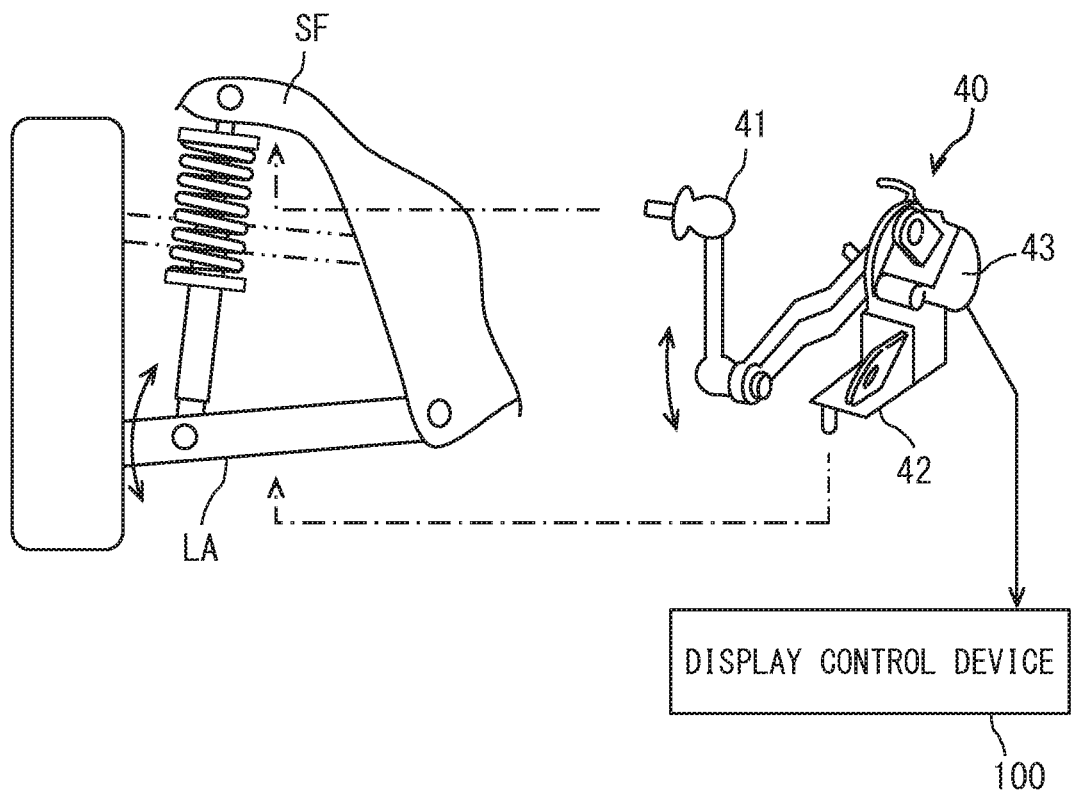
FIG. 2 is a perspective view illustrating an example of a vehicle height sensor.

The vehicle height sensor 40 illustrated in FIG. 2 is a sensor detecting a displacement in the vertical directions which occurs in the vehicle to measure the height of the body from the road surface on which the vehicle stands. The vehicle height sensor 40 measures a sinking amount with respect to the body, of a specific wheel which displaces in the vertical direction by the operation of a suspension arm suspended by the body. Concretely, the vehicle height sensor 40 obtains a relative distance between the body and the suspension arm as detection information and sequentially outputs it toward the display control device 100. Only one vehicle height sensor 40 is attached in a place rearward from the center in the front-rear direction of the vehicle and measures a displacement in the vertical directions in the rear part of the vehicle. In the case of a right-hand-drive vehicle, the vehicle height sensor 40 is attached to the left-rear suspension. In the case of a left-hand-drive vehicle, the vehicle height sensor 40 is attached to the right-rear suspension. The vertical direction is the vertical direction which is along the direction of gravity.

The vehicle height sensor 40 has a first coupling part 41, a second coupling part 42, and a measuring unit 43. The first coupling part 41 can turn relative to the second coupling part 42. The first coupling part 41 is coupled to one of the body and the suspension arm (for example, the body). As an example, the first coupling part 41 is attached to a sub frame SF of the body.

The second coupling part 42 is coupled to the other of the body and the suspension arm which is not coupled to the first coupling part 41 (for example, the suspension). The second coupling part 42 is attached to, for example, a lower arm LA of a plurality of supporting elements supporting the wheel in a suspension device.

The measuring unit 43 measures a displacement amount in the vertical direction of the lower arm LA with respect to the sub frame SF. Specifically, in accordance with a swing of the lower arm LA, the first coupling part 41 turns relative to the second coupling part 42. The measuring unit 43 measures a relative turn amount of the first coupling part 41 as a displacement amount in the vertical direction of the lower arm LA. The measuring unit 43 has, as an example, a magnet and a hall device and detects a change in a magnetic flux accompanying turn of the first coupling part 41 by the hall device. The measuring unit 43 may measure the relative turn amount of the first coupling part 41 by a configuration in which a light emission diode and a photo transistor are combined. The vehicle height sensor 40 sequentially provides an output value of the measuring unit 43 as detection information to the display control device 100.

As illustrated in FIG. 1, the display control device 100 is an electronic control unit configured mainly by a computer having a processor 61, a RAM 62, a memory device 63, and an input/output interface. The processor 61 has a configuration including at least one of a CPU (Central Processing Unit), a GPU (Graphics Processing Unit), and an FPGA (Field-Programmable Gate Array). The processor 61 may include a dedicated processor specialized in learning of AI (Artificial Intelligence) and inference. In the memory device 63, various programs executed by the processor 61 are stored. Concretely, in the memory device 63, an orientation detection program, a display control program, and the like are stored.

Figure 3:
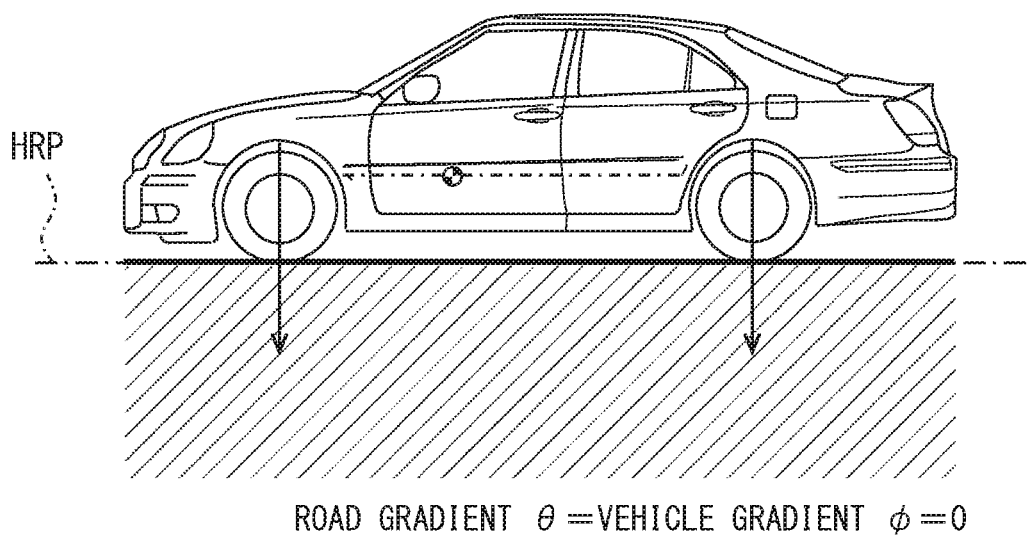
FIG. 3 is a diagram illustrating a state of a vehicle on a flat road having no gradient.
Figure 4:
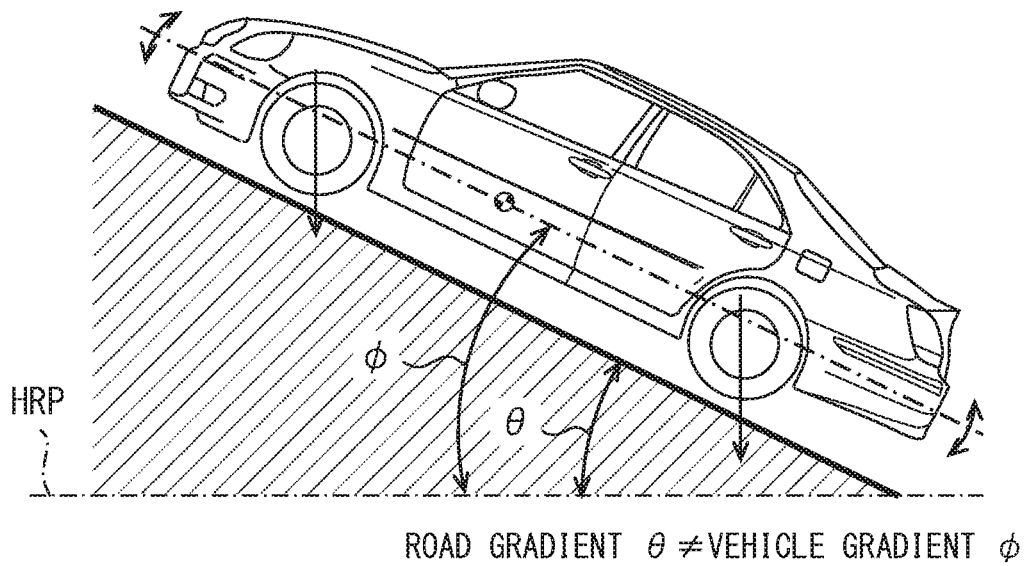
FIG. 4 is a diagram illustrating the state of a vehicle on a sloping road and the relation between a road gradient and a vehicle gradient.

The orientation detection program is a program calculating the orientation angle of a vehicle and, as illustrated in FIGS. 3 and 4, a program capable of computing a road gradient $\theta$ of a road on which the vehicle is travelling, a pitch angle occurring in the vehicle, and a vehicle gradient $\phi$ with respect to a horizontal reference plane HRP. The horizontal reference plane HRP is a virtual plane perpendicularly crossing the gravity direction. As illustrated in FIG. 3, when the vehicle is travelling on a flat road which is along the horizontal reference plane HRP and has no tilt, the road gradient $\theta$ and the vehicle gradient $\phi$ are the same and substantially zero. In addition, in the case where the vehicle is placed on a flat road and both acceleration and brake force in the front-rear direction do not work, the pitch angle is substantially zero. On the other hand, as illustrated in FIG. 4, when a vehicle travels on a sloping road inclined with respect to the horizontal reference plane HRP, the vehicle gradient $\phi$ becomes a value different from the road gradient $\theta$. Concretely, a value obtained by adding the pitch angle occurring in the vehicle to the road gradient $\theta$ becomes the vehicle gradient $\phi$.

Figure 5:
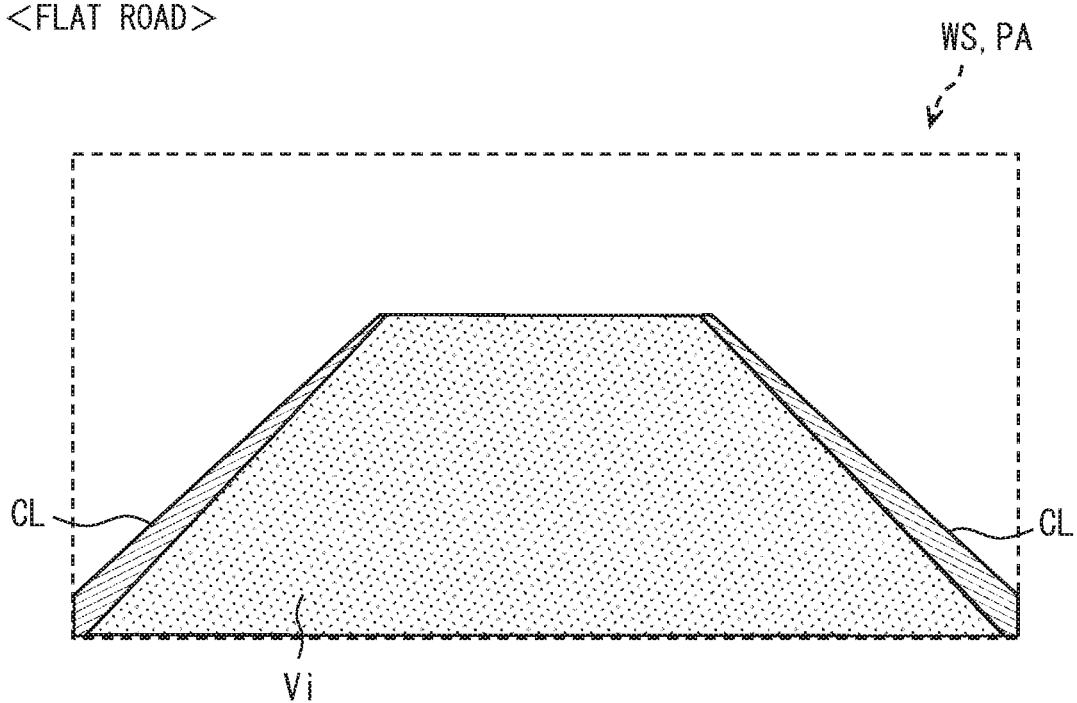
FIG. 5 is a diagram illustrating an example of AR display visually recognized by the driver on a flat road.
Figure 6:
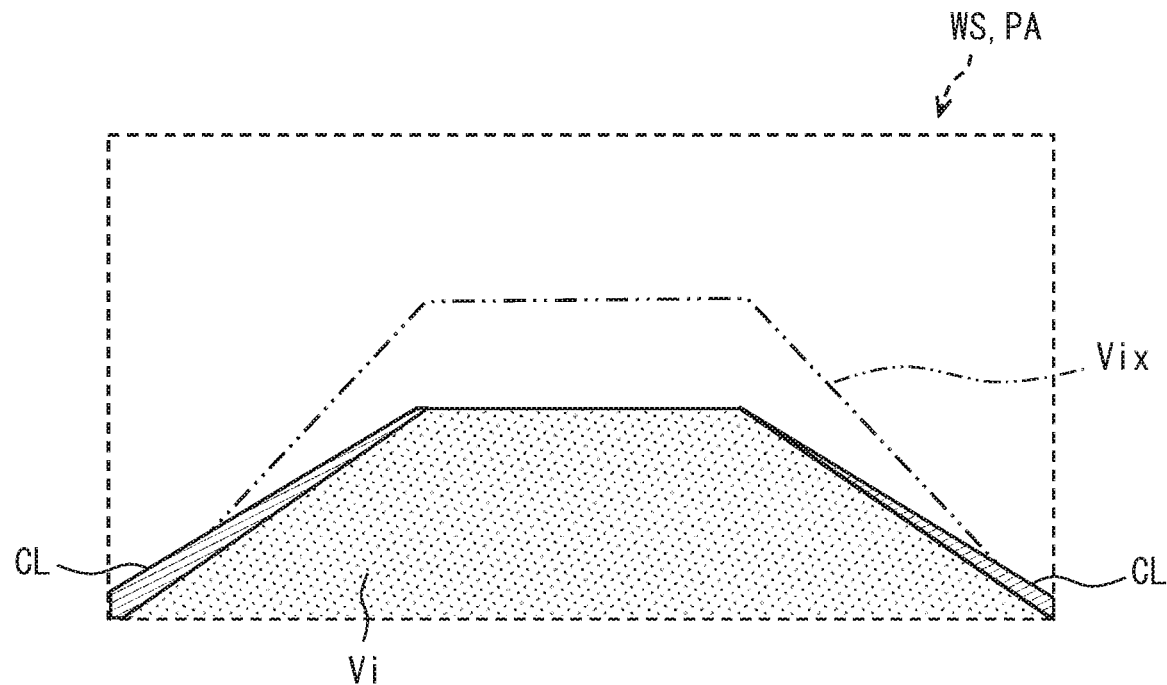
FIG. 6 is a diagram illustrating an example of AR display visually recognized by the driver on a sloping road.

The display control program is a program controlling display of the virtual image Vi and, as illustrated in FIGS. 5 and 6, a program realizing augmented reality (hereinbelow, "AR") display performed by superimposing the virtual image Vi on a superimposition object in a foreground. As an example, the display control program superimposes the virtual image Vi indicating the range of a vehicle line during travel between right and left compartment lines in the foreground. The shape of the road surface visually recognized by the driver through the projection area PA in the case where the vehicle travels on a flat road (refer to FIG. 3) and that in the case where the vehicle travels on a sloping road (refer to FIG. 4) are different. Consequently, when correction in the sloping road is not executed, a virtual image Vix (refer to FIG. 4) deviated from the superposition object may be displayed. By using a computation result of the orientation detection program, the display control program properly controls an image formation position and shape of the virtual image Vi in accordance with the road gradient $\theta$, a change in the orientation of the vehicle, and the like.

As illustrated in FIG. 1, the display control device 100 has function blocks such as an information processing unit 71, a gradient calculation unit 72, a state estimation unit 73, a correlation correction unit 74, and an orientation computation unit 75 by execution of an orientation detection program by the processing unit 61. In addition, the display control device 100 has function blocks such as a correction value computation unit 76 and a display control unit 77 by execution of a display control program by the processing unit 61.

The information processing unit 71 obtains an output value of the vehicle height sensor 40 as detection information indicating a relative distance between the sub frame SF and the lower arm LA (refer to FIG. 2). In addition, the information processing unit 71 detects a no-load state in which a load causing a displacement in the vertical direction in a vehicle does not work on the basis of state information obtained from the state estimation unit 73. The information processing unit 71 sets an output value of the vehicle height sensor 40 in the no-load state as an initial value indicating the state where the pitch angle is zero.

The gradient calculation unit 72 obtains three-dimensional map data from the three-dimensional map data from the three-dimensional map DB 22 on the basis of the position information of the vehicle obtained from the self-vehicle position detection device 21. The gradient calculation unit 72 calculates the road gradient θ (refer to FIG. 4) of the road on which the vehicle travels by using the obtained three-dimensional map data. The road gradient θ is gradient information indicating a longitudinal gradient of a road, which is a positive value on an up-hill slope (refer to FIG. 4) and a negative value in a down-hill slope.

Figure 7:
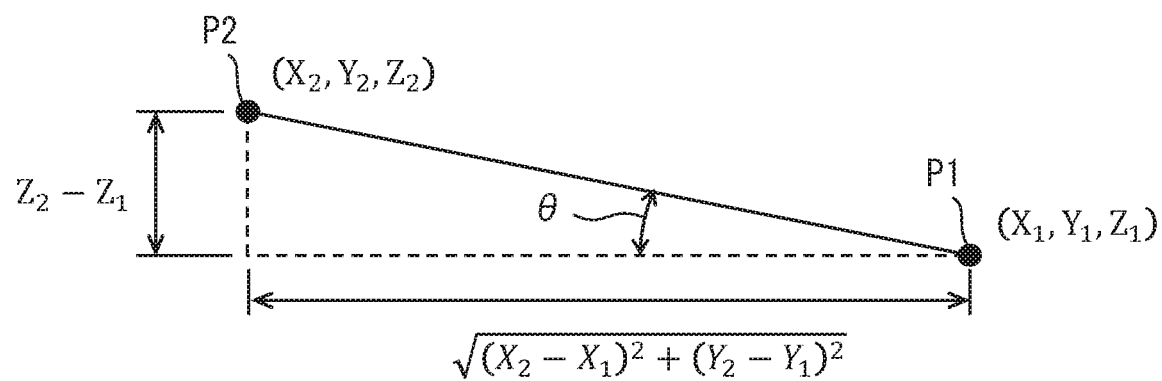
FIG. 7 is a diagram illustrating an example of a method of calculating a road gradient from three-dimensional map data.

As an example, as illustrated in FIG. 7, the gradient calculation unit 72 specifies each of coordinates (refer to (X, Y, Z) of FIG. 7) indicating latitude, longitude, and altitude of two points P1 and P2 specifying a sloping road from information of a point group included in the three-dimensional map data. The gradient calculation unit 72 obtains the road gradient θ of the sloping road by geometric calculation using the coordinates of the two points P1 and P2.

The gradient calculation unit 72 illustrated in FIG. 1 may obtain vehicle speed information from the state estimation unit 73 and correct the position information of the vehicle. Specifically, in position information obtained from the self-vehicle position detection device 21, almost predetermined delay time (100 to 200 milliseconds) occurs. Therefore, the gradient calculation unit 72 can specify the present position of the vehicle with high precision by correcting a distance amount of the vehicle moved in delay time from the position information on the basis of the vehicle speed information on a map.

The state estimation unit 73 estimates the state of the vehicle on the basis of various information obtained from the vehicle state sensor 26 and the occupant sensor 27. The state estimation unit 73 obtains a detection result of an occupant by the occupant sensor 27 and estimates the weight of the vehicle and gravity position on the basis of the number of occupants detected and seating positions. In estimation of the weight and the gravity position, the weight value of each of the occupants is substituted by a preliminarily designated average value. In addition, the state estimation unit 73 determines whether the vehicle is in a no-load state or not by combining vehicle speed information, steering information, acceleration information, accelerator position information, and brake pedal force information. The state information indicating the no-load state of the vehicle is provided to the information processing unit 71 and used for setting an initial value.

The correlation correction unit 74 executes a process of correcting correlation (hereinbelow, "correlation correcting process") between an output value of the vehicle height sensor 40 and the pitch angle of the vehicle as detection information. The correlation correction unit 74 obtains the state information of the vehicle estimated by the state estimation unit 73 and obtains a tilt model corresponding to the present weight and gravity position from the model storage unit 24. The tilt model obtained is a function showing correlation between the output value of the vehicle height sensor 40 and the pitch angle on the flat road (refer to FIG. 3).

The correlation correction unit 74 performs calibration of the tilt model in accordance with the state of the vehicle. Concretely, the correlation correction unit 74 obtains the road gradient θ calculated by the gradient calculation unit 72. The correlation correction unit 74 changes the tilt of the function (refer to the solid line in FIG. 8) as a reference in assumption of a flat road in accordance with positive/negative and absolute values of the road gradient θ (refer to the broken lines in FIG. 8). The correlation correction unit 74 executes the above-described process as the correlation correcting process.

The correlation correction unit 74 may perform, as the correlation correcting process, a process of properly reading a tilt model corresponding to both the weight and gravity position and the road gradient θ from the model storage unit 24. Alternatively, the correlation correction unit 74 may execute, as the above-described correlation correcting process, a process of correcting a tilt model as a reference on the basis of both the weight and the gravity position and the road gradient θ.

Figure 9:
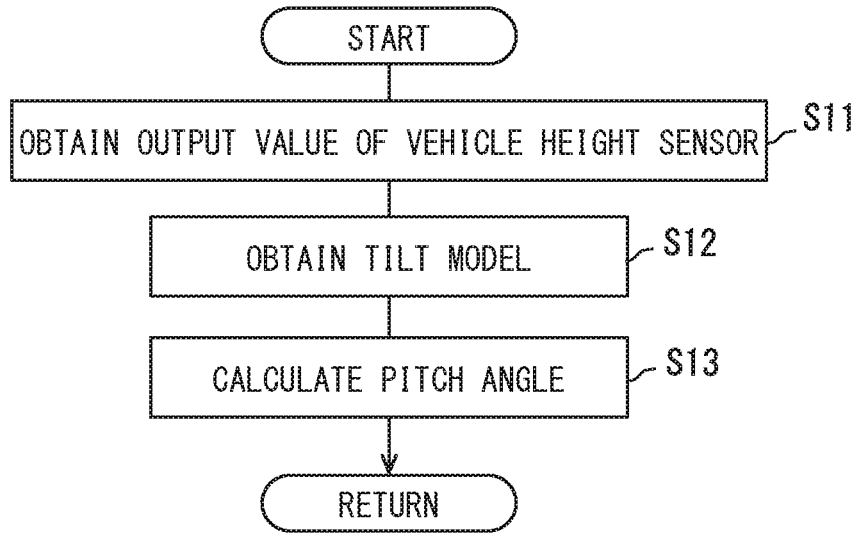
FIG. 9 is a flowchart illustrating an orientation detecting process executed by an orientation computation unit.

The orientation computation unit 75 repeatedly executes the orientation detecting process (refer to FIG. 9). Concretely, the orientation computation unit 75 obtains an output value of the vehicle height sensor 40 from the information processing unit 71 (refer to S11 in FIG. 9) and obtains a corrected tilt model (refer to FIG. 8) from the correlation correction unit 74 (refer to S12 in FIG. 9). The orientation computation unit 75 calculates a pitch angle occurring in the vehicle (refer to S13 in FIG. 9) by a process of applying the output value of the vehicle height sensor 40 to the tilt model (refer to the chain-line arrows in FIG. 8). The orientation computation unit 75 may execute the process of obtaining a tilt model prior to the process of obtaining an output value.

Figure 10:
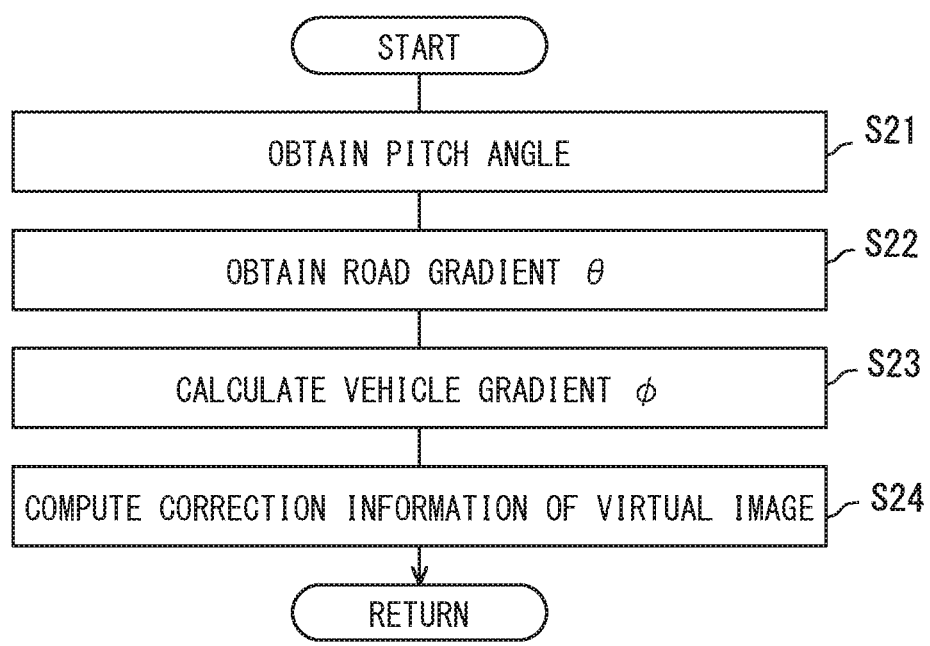
FIG. 10 is a flowchart illustrating a correction value computing process executed by a correction value computation unit.

A correction value computation unit 76 repeatedly executes a correction value computing process (refer to FIG. 10). The correction value computing process is a process of generating correction information for correcting a deviation or the like of the projection position of a display light image accompanying a change in the pitch angle. The correction value computation unit 76 obtains the pitch angle (refer to S21 in FIG. 10) from the orientation computation unit 75 and obtains the road gradient θ (refer to FIG. 7) as gradient information from the gradient calculation unit 72 (refer to S22 in FIG. 10). The correction value computation unit 76 calculates the vehicle gradient φ (refer to S23 in FIG. 10) by a process of adding the pitch angle to the road gradient θ. Further, the correction value computation unit 76 computes correction information for correcting the image formation position and the shape of the virtual image Vi on the basis of the calculated vehicle gradient φ (refer to S24 in FIG. 10). The correction value computation unit 76 may execute the process of obtaining the road gradient θ prior to the process of obtaining the pitch angle.

The display control unit 77 generates video image data of the display light image projected by the projector 11 and sequentially outputs it toward the optical unit 10. In the optical unit 10, the light of the display light image based on the video image data is projected to the projection area PA and formed as the virtual image Vi. The display control unit 77 specifies a relative position of a superimposition object on which the virtual image Vi is superimposed on the basis of the three-dimensional map data, recognition information of an external sensor of a camera or the like mounted in the vehicle, and the like. The display control unit 77 sets a projection position to which the light of the display light image is projected in the projection area PA by geometric computation on the basis of the relations of the relative position of the superimposition object obtained and the positions of the eyellipse of the driver and the projection area PA. The display control unit 77 sets, as a reference position, the projection position of the display light image in the case where the road gradient θ is substantially zero and no change occurs in the orientation of the vehicle.

The display control unit 77 generates video image data in which a deviation in the projection position of the display light image accompanying a change in the road gradient θ and the pitch angle is corrected in advance. Specifically, the display control unit 77 calculates a correction amount from the reference position of the projection position of the display light image accompanying a change in the road gradient θ and the pitch angle on the basis of the correction information obtained from the correction value computation unit 76. The display control unit 77 sets a drawing position and the shape of an original image which becomes the virtual image Vi so that the display light image is projected in the corrected projection position in which the correction amount is reflected in each of the frames constructing the video image data and displays the virtual image by the optical unit 10. By such a process, the virtual image Vi can be correctly superimposed on the superimposition object such as the road surface also in a vehicle which is climbing on a sloping road (refer to FIG. 6).

As described above, the correlation between the output value of the vehicle height sensor 40 and the pitch angle may indicate a substantially unique change in accordance with the magnitude of the road gradient θ. By paying attention to such a phenomenon, in the first embodiment, based on gradient information grasped from three-dimensional map data, the function (tilt model) indicating the correlation between the output value of the vehicle height sensor 40 and the pitch angle can be corrected to a state adapted to the vehicle gradient φ of a road on which the vehicle is travelling. By the above, also during travel on a sloping road with a gradient, the pitch angle computed becomes insusceptible to the influence of the road gradient θ and can become a value maintaining precision. Therefore, while avoiding complication of the configuration for orientation detection, decrease in detection precision of a pitch angle caused by the road gradient θ can be suppressed.

In addition, in the first embodiment, the vehicle gradient φ is calculated by using the detected pitch angle, and the image formation position and the shape of the virtual image Vi are corrected by using correction information computed from the vehicle gradient φ. As described above, by using the pitch angle whose detection precision is assured for the process of making the virtual image Vi follow a superimposition object in the foreground, the high-quality AR display using the virtual image Vi can be provided to the driver.

The display control device 100 of the first embodiment calculates the pitch angle of the vehicle by using the output value of the vehicle height sensor 40. Such a vehicle height sensor 40 is widely spread as a detection configuration used for, for example, a system of adjusting the optical axis of a headlight. Therefore, the display control device 100 obtaining the pitch angle whose precision is assured from the output value of the vehicle height sensor 40 by using a tilt model calibrated in accordance with the vehicle state can remarkably contribute to improvement of realization of the virtual image display system 110 performing AR display by using the virtual image Vi.

In the first embodiment, the vehicle height sensor 40 corresponds to a "sensor", the information processing unit 71 corresponds to a "detection information obtaining unit", the gradient calculation unit 72 corresponds to a "gradient information obtaining unit", and the display control device 100 corresponds to an "orientation detection device".

Second Embodiment

Figure 11:
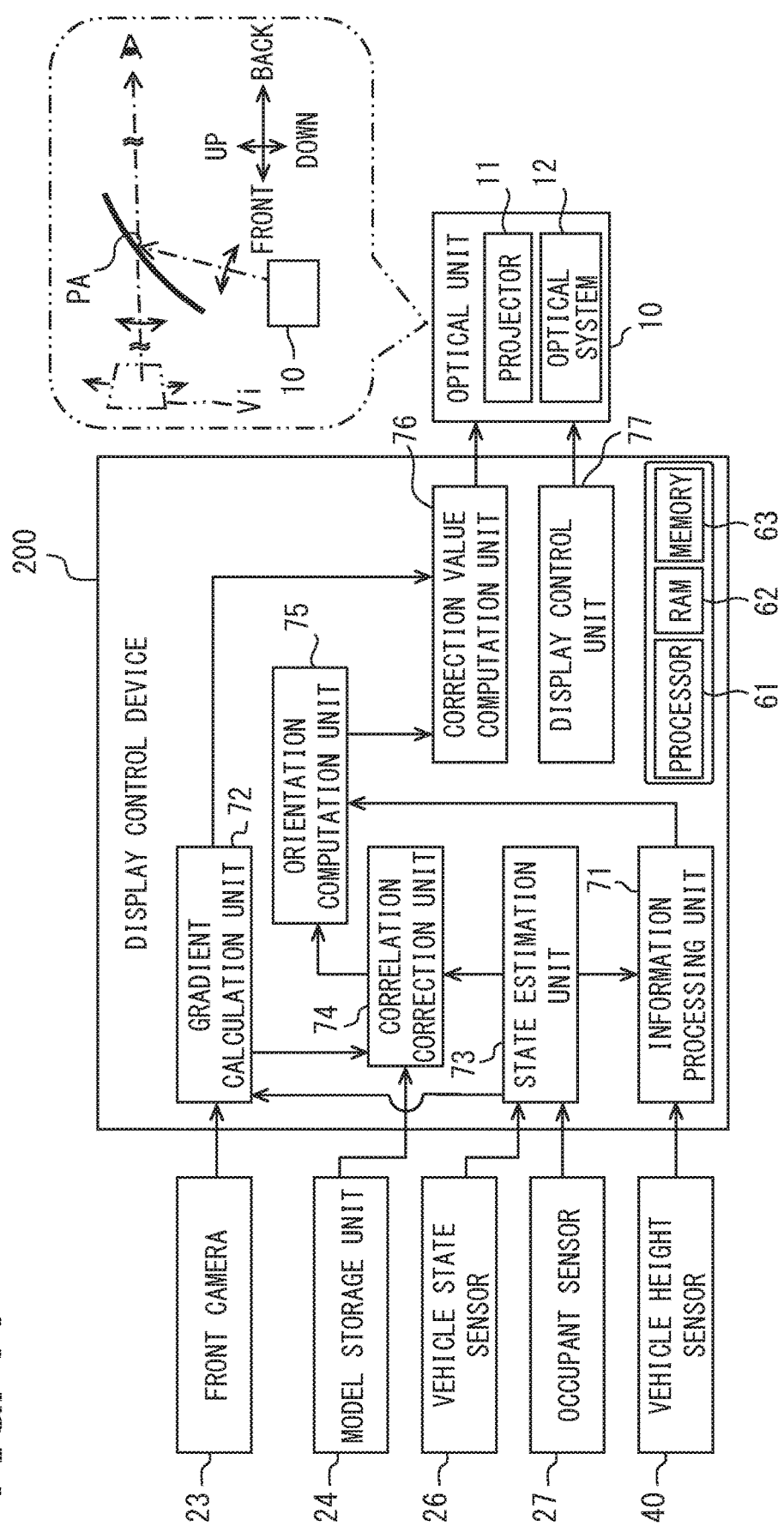
FIG. 11 is a block diagram illustrating a whole image of an in-vehicle system including a display control device according to a second embodiment.
Figure 12:
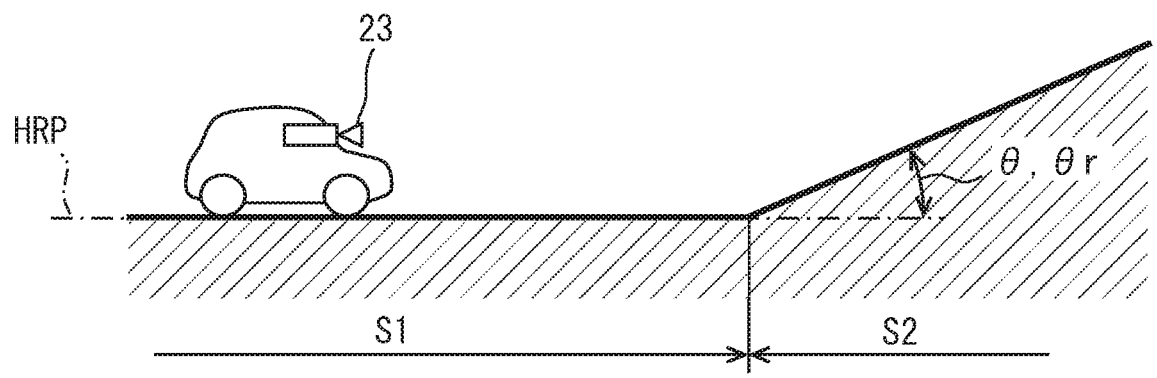
FIG. 12 is a diagram for explaining a method of calculating a road gradient by using a front camera.
Figure 13:
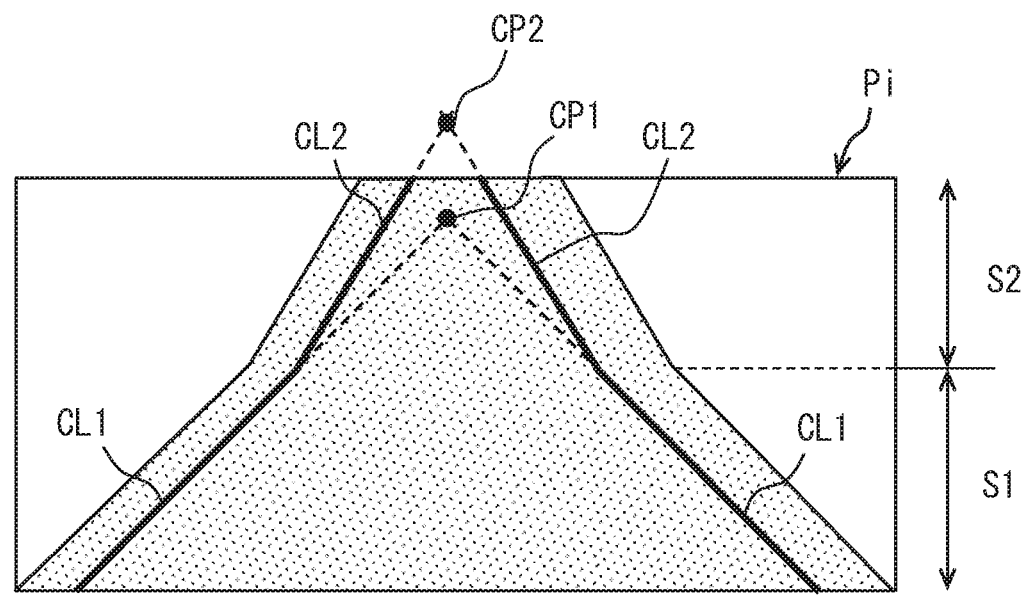
FIG. 13 is a diagram for explaining the details of a process of calculating a road gradient from an image shot in a scene illustrated in FIG. 12.

A second embodiment illustrated in FIGS. 11 to 13 is a modification of the first embodiment. A display control device 200 of the second embodiment is connected to a front camera 23 in place of the self-vehicle position detection device 21 and the three-dimensional map DB 22. Processes executed by the gradient calculation unit 72, the correction value computation unit 76, and the display control unit 77 in the display control device 200 are different from those in the first embodiment.

The front camera 23 is disposed near a back mirror in the compartment of the vehicle in a posture facing (forward) the travel direction of the vehicle. The imaging range of the front camera 23 is set, particularly, in a forward area in the surrounding of the vehicle. The front camera 23 continuously shoots the forward area and generates a series of images Pi of the road surface and horizontal lines in the travel direction. The image Pi taken by the front camera 23 is used for control of, for example, a pre-crash safety system, a lane keeping assist, and the like.

The gradient calculation unit 72 can obtain, in addition to information indicating an estimation value of the weight of the vehicle, accelerator position information, acceleration information, and the like output from the vehicle state sensor 26 from the state estimation unit 73. The gradient calculation unit 72 has the function of determining whether or not the surface of the road on which the vehicle is travelling is a substantially horizontal road which is along the horizontal reference plane HRP. Concretely, the gradient calculation unit 72 determines whether the vehicle is travelling on a horizontal road or not on the basis of comparison between the accelerator position and the acceleration in the front-rear direction generated in the vehicle.

More specifically, the drive force of a vehicle can be estimated on the basis of the accelerator position information. In addition, the weight of the vehicle is estimated by the state estimation unit 73 on the basis of the detection result of the occupant sensor 27. Therefore, the acceleration generated in the vehicle on the horizontal road is unconditionally derived from the accelerator position information. Consequently, in the case where actual acceleration indicated by the acceleration information is the same as or similar to the acceleration derived from the accelerator position information, the state estimation unit 73 can determine that the vehicle is travelling on a horizontal road.

The gradient calculation unit 72 obtains gradient information indicating the road gradient θ of the road on which the vehicle travels on the basis of the image Pi of the forward area taken by the front camera 23. In the case where the gradient in a road section (hereinbelow, "first section S1") in which the vehicle is traveling and that in a forward road section (second section S2) are different (refer to FIG. 12), in the image Pi, a compartment line CL2 in the second section S2 is bent with respect to a compartment CL1 of the first section S1 (refer to FIG. 13). The gradient calculation unit 72 computes a road gradient relative to the first section S1 of the second section S2, in other words, a change amount θr of a longitudinal gradient from the interval between a virtual crossing point CP1 on extension of the two compartment lines CL1 and a virtual crossing point CP2 on extension of the two compartment lines CL2. As described above, a relative gradient of a road in the travel direction can be computed on the basis of the image Pi.

The gradient calculation unit 72 repeats a cumulative process of adding or subtracting a change amount θr of the longitudinal gradient calculated from the image Pi using the road gradient of a horizontal road on which the vehicle is travelling as a reference and obtains the road gradient θ of the road on which the vehicle is travelling. When it is determined that the first section S1 during travel is a horizontal road, the gradient calculation unit 72 resets the road gradient θ to zero as a reference value. The road gradient θ based on the image Pi calculated as described above is provided to the correlation correction unit 74 and used for calibration of a tilt model.

The correction value computation unit 76 repeatedly executes the correction value computing process (refer to FIG. 10) to continuously compute the correction information for correcting the image formation position and the shape of the virtual image Vi in accordance with the vehicle gradient φ (refer to FIG. 4). The correction value computation unit 76 sequentially provides the obtained correction information to the optical unit 10, not to the display control unit 77.

The display control unit 77 generates video image data of a display light image and sequentially outputs it toward the optical unit 10. To the projector 11 of the optical unit 10, both the video image data and the correction information is input. The projector 11 corrects the drawing position and the shape of the original image in each of frames of the video image data on the basis of the correction information and, then, projects the corrected image to the projection area PA. By the above operations, superimposition of the virtual image Vi to the superimposition object is correctly executed also in a vehicle traveling on a sloping road (refer to FIG. 6).

In the foregoing second embodiment, on the basis of the image Pi taken by the front camera 23, gradient information of a road on which the vehicle is travelling is obtained. Based on such gradient information as well, the correlation between the output value of the vehicle height sensor 40 and the pitch angle can be corrected to a state adapted to the road gradient θ of a road on which the vehicle is travelling. Therefore, also in the second embodiment, while avoiding complication of the configuration used for orientation detection, decrease in the detection precision of the pitch angle caused by the road gradient θ can be suppressed.

In addition, in the second embodiment, the horizontal road determining process is executed, and the value of the road gradient θ is reset to zero as a reference value during travel on a horizontal road. Therefore, even in a form of calculating the road gradient θ by using the image Pi, deterioration in precision of the road gradient θ caused by accumulation of errors in the change amount θr can be suppressed. As a result, the detection precision of the pitch angle can be highly maintained. In the second embodiment, the front camera 23 corresponds to an "imaging unit", and the display control device 200 corresponds to an "orientation detection device".

Third Embodiment

Figure 14:
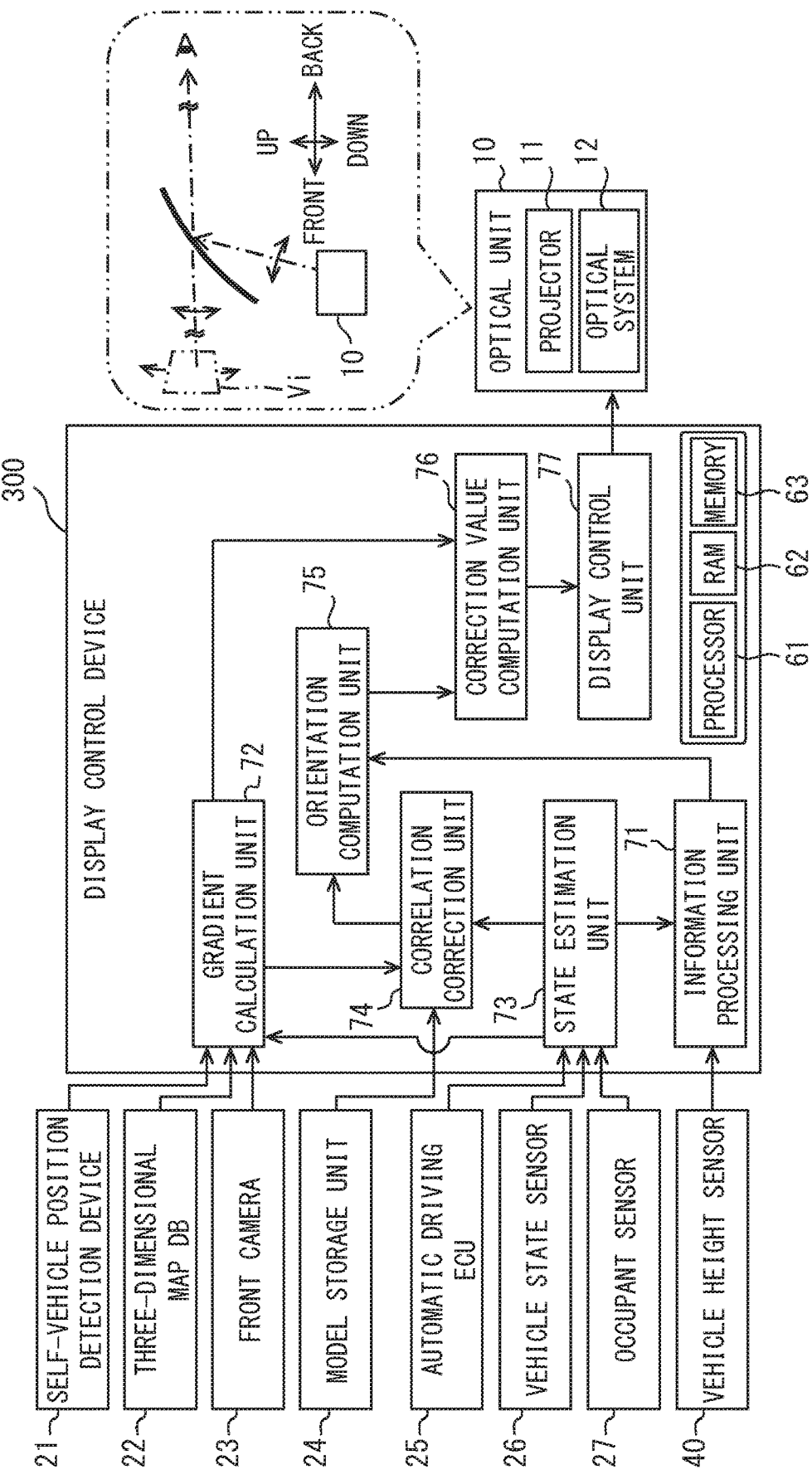
FIG. 14 is a block diagram illustrating a whole image of an in-vehicle system including a display control device according to a third embodiment.

A third embodiment illustrated in FIG. 14 is another modification of the first embodiment. A vehicle in which a display control device 300 according to the third embodiment is mounted has an automatic driving function capable of performing driving operation of the vehicle on behalf of the driver. The automatic driving function is realized mainly by an automatic driving ECU 25. The automatic driving ECU 25 is one of a plurality of electronic control units mounted in the vehicle and directly or indirectly electric-connected to a configuration such as the display control device 300.

The automatic driving ECU 25 has a function of recognizing a self-vehicle position on the basis of position information and three-dimensional map data, a function of recognizing the periphery of the vehicle from detection information of the front camera 23 and the like, a function of drawing up an action plan of the vehicle, a function of controlling vehicle behavior on the basis of the action plan, and the like. The automatic driving ECU 25 makes the vehicle autonomously travel by obtaining a control right of the driving operation from the driver (automatic driving mode). On the other hand, in a state of manual driving (manual driving mode) in which the driver has the control right of the driving operation, the automatic driving ECU 25 stops the automatic driving function.

The state estimation unit 73 is connected to the automatic driving ECU 25 in addition to the vehicle state sensor 26 and the occupant sensor 27. The state estimation unit 73 obtains status information indicative of the operation state of the automatic driving function from the automatic driving ECU 25. The state estimation unit 73 sequentially outputs the status information obtained from the automatic driving ECU 25 to the gradient calculation unit 72.

The gradient calculation unit 72 is connected to the front camera 23 in addition to the self-vehicle position detection device 21 and the three-dimensional map DB 22. The gradient calculation unit 72 has a computation function substantially the same as that of the first embodiment of calculating the road gradient θ on the basis of the position information and the three-dimensional map data (refer to FIG. 7) and a computation function substantially the same as that of the second embodiment of calculating the road gradient θ from the image Pi taken by the front camera 23 (refer to FIG. 13). The gradient calculation unit 72 switches the method of calculating the road gradient θ on the basis of the status information of the automatic driving.

Concretely, in the automatic driving mode in which the automatic driving function makes the vehicle autonomously travel, the gradient calculation unit 72 calculates the road gradient θ on the basis of the position information and the three-dimensional map data. On the other hand, in the manual driving mode in which the automatic driving function is stopped, the gradient calculation unit 72 calculates the road gradient θ on the basis of the image Pi (refer to FIG. 13). The road gradient θ obtained by one of the calculating methods is provided to the correlation correction unit 74 and used for correction of the correlation function (refer to FIG. 7) as a tilt model.

Like the third embodiment described above, the gradient calculation unit 72 may switch the method for obtaining gradient information among a plurality of methods. Even when gradient information obtained by different calculating methods is used, the correlation between the output value of the vehicle height sensor 40 and the pitch angle can be corrected to a state adapted to the road gradient θ of a road on which the vehicle is traveling. Therefore, also in the third embodiment, while avoiding complication of the configuration used for orientation detection, decrease in detection precision of the pitch angle caused by the road gradient θ can be suppressed.

In addition, the three-dimensional map data is prepared preferentially for an area in which autonomous travel by the automatic driving function can be performed. Therefore, the presence/absence of three-dimensional map data can be closely related to whether it is in a range in which the autonomous travel by the automatic driving function can be performed. By such background, the gradient calculation unit 72 switches from the calculating method using three-dimensional map data to a calculating method which does not depend on three-dimensional map data in association with the operation stop of the automatic driving function. By the above, the gradient calculation unit 72 can smoothly complete the switching of the calculating method before it becomes impossible to obtain three-dimensional map data. Therefore, also in the case where the vehicle moves from an area where three-dimensional map data is prepared to an area in which the data is not prepared, computation of the pitch angle in which precision is assured can be continued. As a result, the state where the virtual image Vi is correctly superimposed on the superimposition object can also be maintained with high reliability. In the third embodiment, the display control device 300 corresponds to an "orientation detection device".

Fourth Embodiment

Figure 15:
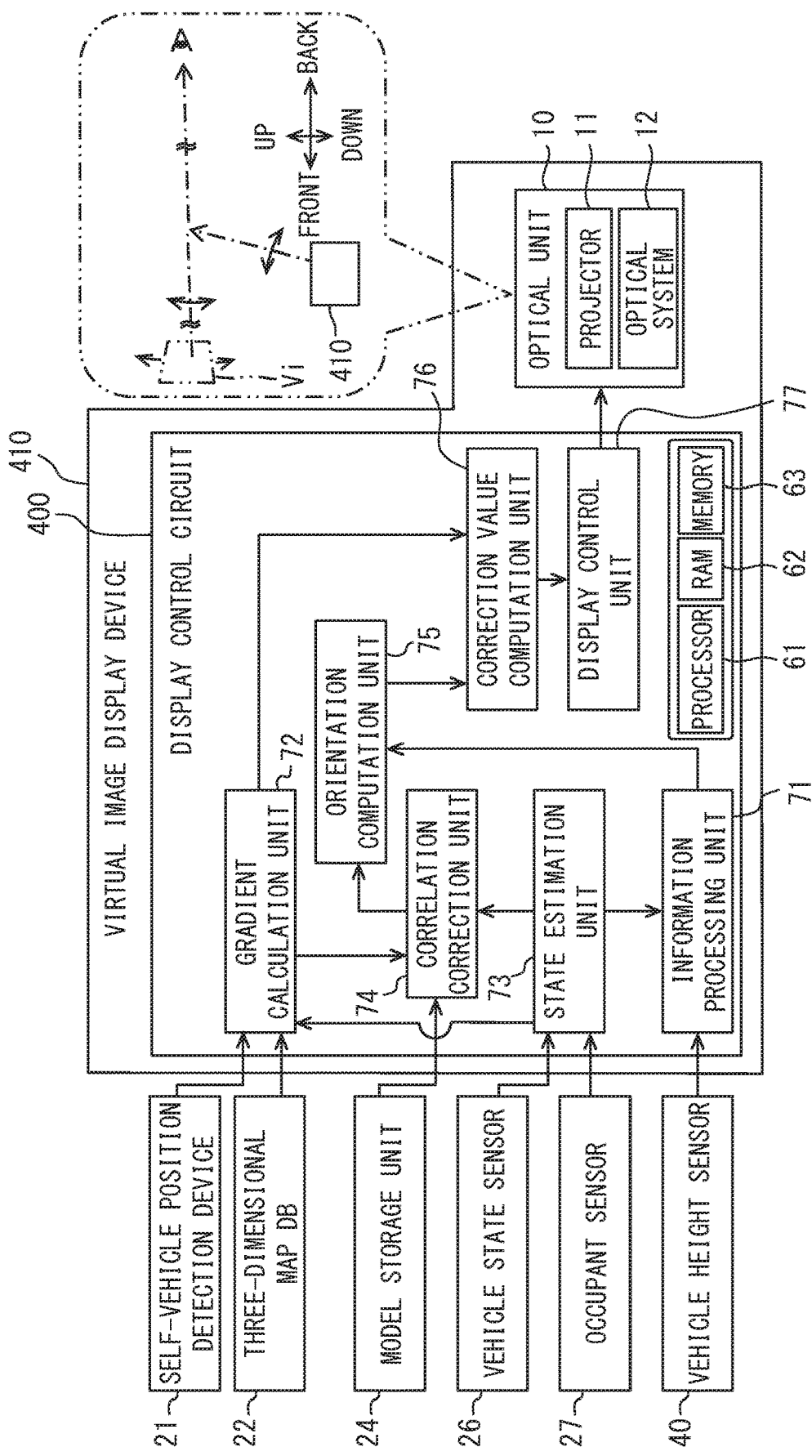
FIG. 15 is a block diagram illustrating a whole image of an in-vehicle system including a display control device according to a fourth embodiment.

A fourth embodiment illustrated in FIG. 15 is further another modification of the first embodiment. A virtual image display device 410 according to the fourth embodiment has a configuration that a display control device and a display are integrated, and has the optical unit 10 and a display control circuit 400. The display control circuit 400 is an electric configuration corresponding to a display control device and has a plurality of function blocks (71 to 77).

The gradient calculation unit 72 of the display control circuit 400 obtains, in a manner similar to the second embodiment, information indicative of an estimation value of the weight of a vehicle and, in addition, the accelerator position information, the acceleration information, and the like output from the vehicle state sensor 26 from the state estimation unit 73. The gradient calculation unit 72 has, in addition to the computation function (refer to FIG. 7) substantially the same as that of the first embodiment of calculating the road gradient θ from the position information and three-dimensional map data, a computation function of calculating the road gradient θ on the basis of comparison between accelerator position and acceleration.

As described above, the acceleration generated in a vehicle which travels on a horizontal road can be unconditionally derived from accelerator position information. Therefore, the difference between actual acceleration (hereinbelow, "measurement acceleration") indicated by acceleration information and acceleration (hereinbelow, "estimated acceleration") derived from the accelerator position information increases/decreases depending on the magnitude of slope climb resistance acting on a vehicle, that is, the magnitude of the road gradient θ. By the above, a three-dimensional computation map of calculating the road gradient θ from the accelerator position information and the acceleration information can be specified in advance. The gradient calculation unit 72 can calculate the road gradient θ by application of the accelerator position information and the acceleration information to the computation map.

In the case where three-dimensional map data can be obtained from the three-dimensional map DB 22, the gradient calculation unit 72 calculates the road gradient θ on the basis of the position information and the three-dimensional map data. On the other hand, in the case where three-dimensional map data of a road on which a vehicle travels cannot be obtained in an area in which three-dimensional map data is not ready, the gradient calculation unit 72 calculates the road gradient θ on the basis of comparison between accelerator position information and acceleration information. The road gradient θ obtained by any one of the calculating methods is provided to the correlation correction unit 74 and used for correction of the correlation function (refer to FIG. 7).

In the fourth embodiment described above, based on comparison between the accelerator position and the acceleration in the front-rear direction, gradient information of a road on which the vehicle is travelling is obtained. Also based on such gradient information, the correlation between the output value of the vehicle height sensor 40 and the pitch angle can be corrected to a state adapted to the road gradient θ of a road on which the vehicle is travelling. Therefore, also in the fourth embodiment, while avoiding complication of the configuration used for orientation detection, decrease in the detection precision of the pitch angle caused by the road gradient θ can be suppressed.

In addition, the AP sensor detecting the accelerator position, the acceleration sensor detecting acceleration in the front-rear direction, and the like are detection configurations already mounted in a general vehicle. Therefore, in employment of the calculating method of the present disclosure of estimating the road gradient θ by using such detection configurations, together with the configuration of detecting a displacement in the vertical direction only by a single vehicle height sensor 40, addition of a configuration for orientation detection can be suppressed to minimum. In the fourth embodiment, the virtual image display device 410 corresponds to the "orientation detection device".

Fifth Embodiment

Figure 16:
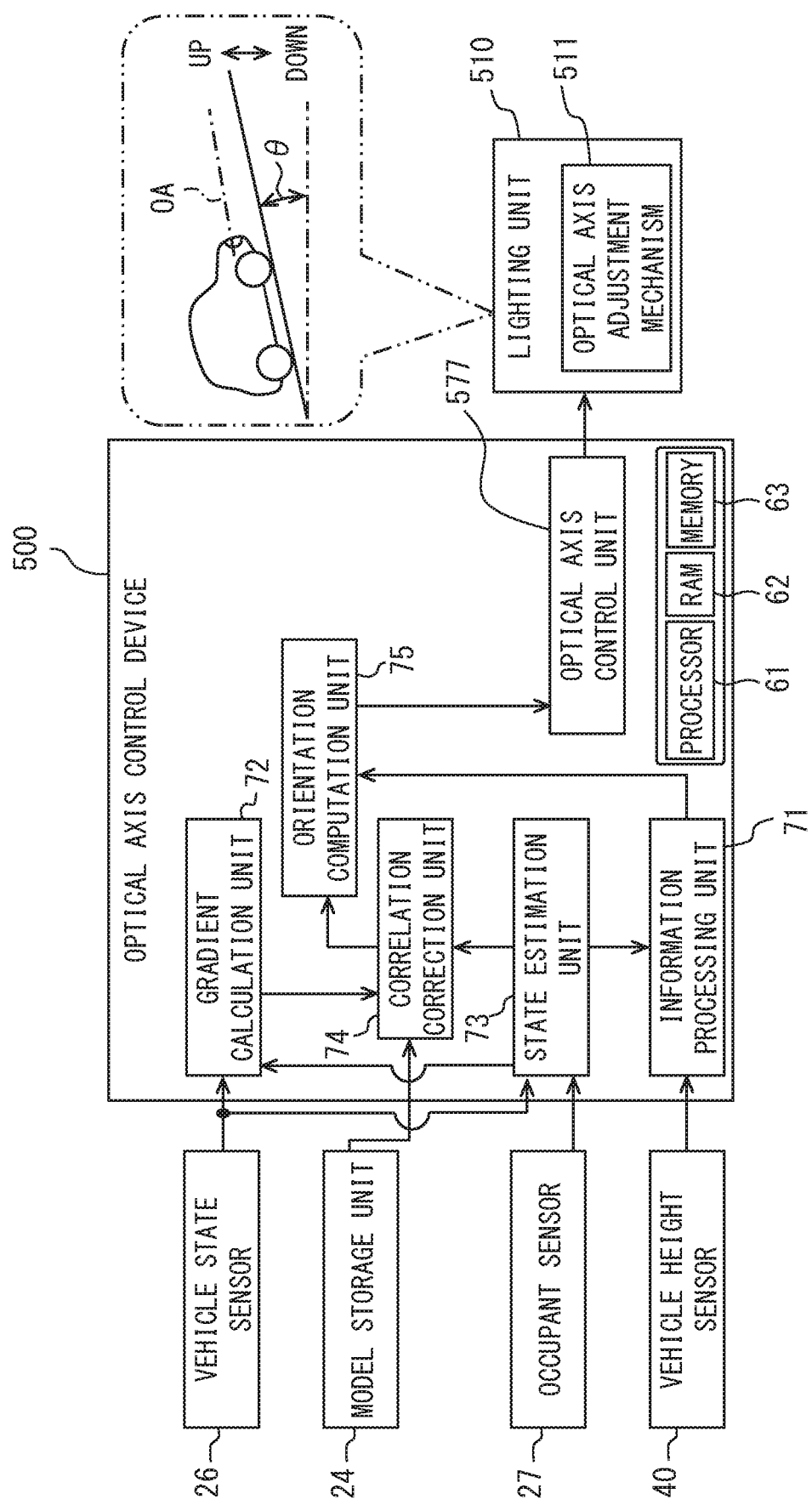
FIG. 16 is a block diagram illustrating a whole image of an in-vehicle system including a display control device according to a fifth embodiment.

A fifth embodiment illustrated in FIG. 16 is further another modification of the first embodiment. The function of an orientation detection device in the fifth embodiment is realized by an optical axis control device 500. The optical axis control device 500 is connected to a lighting unit 510 and adjusts the position of an optical axis OA of a headlight in the vertical direction.

The optical axis control device 500 has, in addition to a plurality of function blocks (71 to 75) similar to those in the first embodiment, an optical axis control unit 577. In the fifth embodiment, the method of calculating the road gradient θ executed by the gradient calculation unit 72 is different from that in the first embodiment. Hereinafter, the details of processes executed by the gradient calculation unit 72 and the optical axis control unit 577 will be described in order.

The gradient calculation unit 72 obtains accelerator position information and acceleration information from the vehicle state sensor 26. In a manner similar to the fourth embodiment, the gradient calculation unit 72 obtains an estimation value of vehicle weight estimated by the state estimation unit 73 and calculates the road gradient θ on the basis of comparison between the accelerator position and the acceleration. The road gradient θ calculated by the gradient calculation unit 72 is provided to the correlation correction unit 74 and used for calibration of a tilt model.

The optical axis control unit 577 adjusts the optical axis OA of the headlight to a proper position in cooperation with the optical axis adjustment mechanism 511 provided for the lighting unit 510. In the orientation computation unit 75, by fitting an output value of the vehicle height sensor 40 to the tilt model calibrated by the correlation correction unit 74, a pitch angle is calculated. The optical axis control unit 577 corrects a deviation of the optical axis OA accompanying a change in the orientation of the vehicle by using the pitch angle calculated by the orientation computation unit 75. By the above, also in a vehicle which travels, particularly, up or down on a sloping road, the optical axis OA is adjusted to a position where the road surface of the sloping road can be irradiated correctly.

The fifth embodiment described above also produces effects similar to those of the first embodiment, and the correlation between the output value of the vehicle height sensor 40 and the pitch angle can be corrected to a state adapted to the road gradient $\theta$. Therefore, while avoiding complication of the configuration used for orientation detection, decrease in detection precision of the pitch angle caused by the road gradient $\theta$ can be suppressed.

In addition, in the fifth embodiment, by the process of applying the output value of the vehicle height sensor 40 to the tilt model calibrated in accordance with the road gradient $\theta$, a pitch angle of the vehicle is obtained, and the position of the optical axis OA is adjusted on the basis of the pitch angle. The position control of the optical axis OA can continuously properly maintain the irradiation range of the headlight more than a conventional technique in which the optical axis OA is adjusted by using an output value of the vehicle height sensor 40 without considering the road gradient $\theta$. In the fifth embodiment, the optical axis adjustment mechanism 511 corresponds to an "optical axis adjustment unit", and the optical axis control device 500 corresponds to an "orientation detection device".

Other Embodiments

Although the plurality of embodiments of the present disclosure have been described above, the present disclosure is not interpreted by being limited to the foregoing embodiments but can be applied to various embodiments and combinations in a range which does not depart from the gist of the present disclosure.

In a first modification of the embodiment, an acceleration sensor for detecting acceleration in the vertical direction is used as a sensor detecting a displacement in the vertical direction occurring in a vehicle. The acceleration sensor measures relative acceleration between the body and the suspension arm. An information processing unit in the first modification obtains a displacement amount in the vertical direction by computation of time-integrating the relative acceleration detected by the acceleration sensor twice. The information processing unit can obtain detection information corresponding to an output value of the vehicle height sensor by a process of integrating a displacement amount.

In a second modification of the third embodiment, the gradient calculation unit switches the method of calculating the road gradient $\theta$ on the basis of whether three-dimensional map data can be obtained or not. In an area where the three-dimensional map data is prepared, the gradient calculation unit calculates the road gradient $\theta$ on the basis of the three-dimensional map data and position information. On the other hand, in an area where the three-dimensional map data is not ready and three-dimensional map data of a road on which the vehicle travels cannot be obtained, the gradient calculation unit obtains the road gradient $\theta$ on the basis of the image Pi taken by the front camera 23.

In a third modification of the third embodiment, the gradient calculation unit has three computation functions of calculating the road gradient $\theta$. Specifically, in the case where the automatic driving function operates, the gradient calculation unit calculates the road gradient $\theta$ on the basis of three-dimensional map data. When the automatic driving function is stopped, the gradient calculation unit 72 calculates the road gradient $\theta$ on the basis of the image Pi. Further, in the case where it is difficult to extract the compartment line CL from the image Pi, the gradient calculation unit calculates the road gradient $\theta$ on the basis of comparison between accelerator position and acceleration.

In a fourth modification of the fourth embodiment, the display control device is connected to the automatic driving ECU. In a manner similar to the third embodiment, in the case where the automatic driving function makes the vehicle autonomously travel, the gradient calculation unit of the fourth modification calculates the road gradient $\theta$ on the basis of position information and three-dimensional map data. On the other hand, in the case where the automatic driving function stops, the gradient calculation unit calculates the road gradient $\theta$ on the basis of comparison between accelerator position and acceleration.

The gradient calculation unit of the embodiment obtains a tilt model of a vehicle from the model storage unit connected to the display control device. However, the configuration of storing a tilt model is not limited to an external model storage unit but may be a memory device in the display control device.

In the first to fourth embodiments, by the process of correcting an original image in each of frames of video image data, display in which the virtual image Vi is superimposed on the superimposition object is maintained. However, when the optical unit is provided with an adjustment mechanism of adjusting the orientation of the reflective optical system, by a mechanical control of operating the adjustment mechanism on the basis of correction information, the superimposition state of the virtual image Vi may be maintained.

The optical axis control device of the fifth embodiment is provided separately from the lighting unit. However, a control circuit corresponding to the optical axis control device may be provided integrally with the lighting unit. Further, the optical axis adjustment mechanism may be a configuration of mechanically changing the orientation of the headlight or a configuration of electrically controlling a light-on state of a plurality of light emission diodes.

The process for orientation detection described above may be executed by a configuration different from the display control device, the display control circuit, and the like. For example, a combination meter, a navigation device, or the like may obtain the function of the orientation detection device by executing the orientation detection program by a control circuit. In such a manner, the function of the orientation detection device may be a function of one of function parts mounted in a vehicle. Further, the control circuit of the automatic driving ECU may function as the process unit of executing computation based on the orientation detection program. Alternatively, a plurality of control circuits of the display control device, the display device, the automatic driving ECU, and the like may dispersedly process the computation for orientation detection.

Various non-transitory tangible storage media such as a flash memory and a hard disk can be employed in the memory device as a configuration of storing the orientation detection program. In addition, a storage medium storing the orientation detection program is not limited to the storage medium provided for the electronic control unit mounted in a vehicle but may be an optical disk, a hard disk drive of a general computer, or the like as a copy source to the storage medium.

It is noted that a flowchart or the processing of the flowchart in the present disclosure includes sections (also referred to as steps), each of which is represented, for instance, as S101. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

What is claimed is:

1. An orientation detection device for detecting orientation of a vehicle, comprising:
   a detection information obtaining unit that obtains a detection information of a sensor, which detects a displacement in a vertical direction occurring in the vehicle;
   an orientation computation unit that computes a pitch angle of the vehicle on the basis of the detection information;
   a gradient information obtaining unit that obtains a gradient information indicating a gradient of a road on which the vehicle travels; and
   a correlation correction unit that corrects a correlation between the detection information used in computation of the orientation computation unit and the pitch angle on the basis of the gradient information.

2. The orientation detection device according to claim 1, wherein
   the gradient information obtaining unit obtains the gradient information on the basis of three-dimensional map data.

3. The orientation detection device according to claim 2, wherein
   the gradient information obtaining unit obtains the gradient information on the basis of an image of surrounding of the vehicle taken by an imaging unit, in a case where the three-dimensional map data is not obtained.

4. The orientation detection device according to claim 2, wherein
   the vehicle has an automatic driving function,
   the gradient information obtaining unit obtains the gradient information on the basis of the three-dimensional map data in response to the automatic driving function being in operation to make the vehicle travel, and
   the gradient information obtaining unit obtains the gradient information on the basis of an image of surrounding of the vehicle taken by an imaging unit in response to the automatic driving function being not in operation.

5. The orientation detection device according to claim 2, wherein
   in a case where the three-dimensional map data regarding the road on which the vehicle travels cannot be obtained, the gradient information obtaining unit obtains the gradient information on the basis of comparison between an accelerator position of the vehicle during travel and an acceleration in the front-rear direction generated in the vehicle.

6. The orientation detection device according to claim 2, wherein
   the vehicle has an automatic driving function,
   the gradient information obtaining unit obtains the gradient information on the basis of the three-dimensional map data in response to the automatic driving function being in operation to make the vehicle travel, and
   the gradient information obtaining unit obtains the gradient information on the basis of comparison between an accelerator position of the vehicle during travel and an acceleration in the front-rear direction generated in the vehicle in response to the automatic driving function being not in operation.

7. The orientation detection device according to claim 1, wherein
   the gradient information obtaining unit obtains the gradient information on the basis of an image of surrounding of the vehicle taken by an imaging unit.

8. The orientation detection device according to claim 7, wherein
   the gradient information obtaining unit determines whether the vehicle travels on a horizontal road on the basis of comparison between an accelerator position of the vehicle which is traveling and an acceleration in the front-rear direction generated in the vehicle, and computes a gradient of a road in the travel direction using, as a reference, the road gradient of the horizontal road on which the vehicle travels on the basis of the image.

9. The orientation detection device according to claim 1, wherein
   the gradient information obtaining unit obtains the gradient information on the basis of comparison between an accelerator position of the vehicle during travel and an acceleration in the front-rear direction generated in the vehicle.

10. The orientation detection device according to claim 1, which is to be connected to an optical unit projecting a display light image to a projection area designated in the vehicle and displaying a virtual image of the display light image so that the virtual image is visible by an occupant of the vehicle, the orientation detection device further comprising:
    a correction value computation unit that generates a correction information for correcting a deviation of a projection position of the display light image in accordance with a change in the pitch angle by using the pitch angle calculated by the orientation computation unit.

11. The orientation detection device according to claim 10, further comprising
    a display control unit that generates a video image data obtained by preliminarily correcting a deviation of a projection position of the display light image in accordance with a change in the pitch angle by using the correction information and displays the video image data as a virtual image by the optical unit.

12. The orientation detection device according to claim 1, further comprising:
    an optical unit that projects a display light image to a projection area designated in the vehicle and displays a virtual image of the display light image so that the virtual image is visually recognized by an occupant of the vehicle; and
    a correction value computation unit that generates a correction information for correcting a deviation of a projection position of the display light image in accordance with a change in the pitch angle by using the pitch angle calculated by the orientation computation unit.

13. The orientation detection device according to claim 1, which is to be connected to a lighting unit that has an optical axis adjusting unit adjusting an optical axis of a headlight of the vehicle, the orientation detection device further comprising
    an optical axis control unit that corrects a deviation of the optical axis in accordance with an orientation change of the vehicle by using the pitch angle calculated by the orientation computation unit.

14. The orientation detection device according to claim 1, wherein
the detection information obtaining unit obtains, as the detection information, at least one of a relative distance between a body of the vehicle and a suspension arm suspended in the body and a relative acceleration between the body and the suspension arm.

15. A non-transitory computer readable medium storing a computer program product comprising instructions for detecting orientation of a vehicle, the instructions being configured to, when executed by a processor, cause the processor to:
obtain a detection information of a sensor, which detects a displacement in the vertical direction occurring in the vehicle;
compute a pitch angle of the vehicle on the basis of the detection information;
obtain a gradient information indicating a gradient of a road on which the vehicle travels; and
corrects a correlation between the detection information used in computation and the pitch angle on the basis of the gradient information.

16. An orientation detection device for detecting orientation of a vehicle, comprising a processor configured to:
obtain a detection information of a sensor, which detects a displacement in a vertical direction occurring in the vehicle;
compute a pitch angle of the vehicle on the basis of the detection information;
obtain a gradient information indicating a gradient of a road on which the vehicle travels; and
correct a correlation between the detection information used in computation and the pitch angle on the basis of the gradient information.

* * * * *